United States Patent
Goel et al.

(10) Patent No.: US 10,937,470 B2
(45) Date of Patent: Mar. 2, 2021

(54) SYSTEMS AND METHODS FOR DYNAMIC DATA MASKING

(71) Applicant: FMR LLC, Boston, MA (US)

(72) Inventors: Nilesh Goel, Kolkata (IN); Samir Kakkar, Bangalore (IN); Meenakshi Ashokkumar, Bangalore (IN); Joseph Menezes, Bangalore (IN); Dhiman Dasgupta, Bangalore (IN)

(73) Assignee: FMR LLC, Boston, MA (US)

( * ) Notice: Subject to any disclaimer, the term of this patent is extended or adjusted under 35 U.S.C. 154(b) by 282 days.

(21) Appl. No.: 15/866,813

(22) Filed: Jan. 10, 2018

(65) Prior Publication Data
US 2019/0214060 A1      Jul. 11, 2019

(51) Int. Cl.
| | |
|---|---|
| *G06F 21/62* | (2013.01) |
| *H04L 29/06* | (2006.01) |
| *G11C 7/10* | (2006.01) |
| *G06F 3/14* | (2006.01) |

(52) U.S. Cl.
CPC ........ *G11C 7/1009* (2013.01); *G06F 21/6245* (2013.01); *G06F 3/14* (2013.01); *H04L 63/20* (2013.01)

(58) Field of Classification Search
CPC ..... G11C 7/1009; G06F 21/6245; G06F 3/14; H04L 63/20
See application file for complete search history.

(56) References Cited

U.S. PATENT DOCUMENTS

| | | | | |
|---|---|---|---|---|
| 8,832,832 | B1 * | 9/2014 | Visbal | H04L 63/0272 726/22 |
| 9,165,128 | B1 | 10/2015 | Daniel | |
| 2010/0024037 | A1 * | 1/2010 | Grzymala-Busse | G06F 21/6245 726/26 |
| 2010/0115627 | A1 * | 5/2010 | Chow | H04N 21/8355 726/28 |
| 2010/0211997 | A1 * | 8/2010 | McGeehan | H04L 63/1483 726/4 |
| 2012/0005169 | A1 * | 1/2012 | Saxena | G06F 21/6227 707/687 |

(Continued)

OTHER PUBLICATIONS

Weiss et al., "Trust Evaluation in Mobile Devices: An Empirical Study," 2015 IEEE Trustcom/BigDataSE/ISPA Year: 2015 | vol. 1 | Conference Paper | Publisher: IEEE.*

(Continued)

*Primary Examiner* — Roderick Tolentino
(74) *Attorney, Agent, or Firm* — Proskauer Rose LLP (57) ABSTRACT

A computer-implemented method is provided for automatically masking data for display in a mobile computing device. The computer-implemented method includes receiving a request to display data on the mobile computing device and detecting a physical location of the mobile computing device, a time corresponding to the request, and at least one network characteristic of a wireless network on which the mobile computing device is making the request. The method also includes automatically determining whether to mask the data for display in the mobile computing device based on the physical location, the time, and the at least one network characteristic. The method further includes responsive to determining to mask the data, applying one or more masking rules to the data.

15 Claims, 4 Drawing Sheets

(56) References Cited

U.S. PATENT DOCUMENTS

| | | | | |
|---|---|---|---|---|
| 2012/0210388 A1* | 8/2012 | Kolishchak | ............ | G06F 21/552 |
| | | | | 726/1 |
| 2013/0254857 A1* | 9/2013 | Bajenov | ................ | H04L 63/083 |
| | | | | 726/7 |
| 2014/0173686 A1* | 6/2014 | Kgil | ...................... | H04L 63/205 |
| | | | | 726/1 |
| 2015/0089568 A1* | 3/2015 | Sprague | .................. | H04L 63/06 |
| | | | | 726/1 |
| 2015/0242605 A1* | 8/2015 | Du | .......................... | G06F 21/31 |
| | | | | 726/7 |
| 2016/0379010 A1 | 12/2016 | Farkash et al. | | |
| 2017/0063755 A1* | 3/2017 | Pulfer | ..................... | H04L 51/12 |

OTHER PUBLICATIONS

Yuan et al., "A Broker-guided Trust Calculation Model for Mobile Devices of D2D Communications," 2018 IEEE Symposium on Computers and Communications (ISCC) Year: 2018 | Conference Paper | Publisher: IEEE.*

* cited by examiner

SYSTEMS AND METHODS FOR DYNAMIC DATA MASKING

TECHNICAL FIELD

This application relates generally to systems, methods and apparatuses, including computer program products, for automatically masking data for display on a mobile computing device.

BACKGROUND

A user often accesses sensitive data, such as personal financial information, over a mobile computing device in a public space. This form of data retrieval can easily expose the data to others who are physically close to the user, which can lead to a breach of privacy and unintended exposure of confidential information (e.g., account number, balances, stock positions, etc.) For example, surveys have shown that 67% of the respondents have experienced people peeping into their mobile phone screens while using a financial service application on a mobile device and 50% of the respondents feel that such peeping is a breach of privacy.

SUMMARY

Accordingly, there is a need for systems, methods and apparatuses that can dynamically mask/unmask data based on location and other factors. This approach allows a user to become more comfortable accessing sensitive information in a public space.

In one aspect, a computer-implemented method is provided for automatically masking data for display in a mobile computing device. The computer-implemented method includes receiving, by a computing device, a request to display data on the mobile computing device, and detecting, by the computing device, a physical location of the mobile computing device, a time corresponding to the request, and at least one network characteristic of a wireless network on which the mobile computing device is making the request. The method also includes automatically determining, by the computing device, whether to mask the data for display in the mobile computing device based on the physical location, the time, and the at least one network characteristic. Responsive to determining to mask the data, the method further includes applying, by the computing device, one or more masking rules to the data.

In another aspect, a computer program product, tangibly embodied in a non-transitory computer readable storage device, is provided for automatically masking data for display in a mobile computing device. The computer program product includes instructions operable to cause a computing device to receive a request to display data on the mobile computing device and detect a physical location of the mobile computing device, a time corresponding to the request, and at least one network characteristic of a wireless network on which the mobile computing device is making the request. The computer program product also includes instructions operable to automatically determine whether to mask the data for display in the mobile computing device based on the physical location, the time, and the at least one network characteristic. Responsive to determining to mask the data, the computer program product further includes instructions operable to apply one or more masking rules to the data.

In yet another aspect, a computer system is provided that is in electrical communication with a mobile computing device. The computer system is configured to automatically mask data for display in the mobile computing device. The computer system includes an input for receiving a request from the mobile computing device to display data and a detection module for detecting a physical location of the mobile computing device, a time corresponding to the request, and at least one network characteristic of a wireless network on which the mobile computing device is making the request. The computer system also includes a determination module for automatically determining whether to mask the data for display in the mobile computing device based on the physical location, the time, and the at least one network characteristic. The computer system further includes a masking module for applying one or more masking rules to the data in response to determining to mask the data.

Any of the above aspects can include one or more of the following features. In some embodiments, the one or more masking rules comprise masking every character of a data string. In some embodiments, the time corresponding to the request comprises one of a time of the day, a day of the week or a day of the month of the request.

In some embodiments, automatically determining whether to mask the data comprises learning, by the computing device, a pattern associated with historical interactions of a user with a software application in which the data request is made. The historical interactions can comprise the user manually activating a masking feature to mask data in the software application. In some embodiments, the pattern is generated based on a plurality factors including locations of the mobile computing device when the masking feature was activated, times of the day when the masking feature was activated, and characteristics of wireless networks associated with the mobile computing device when the masking feature was activated. In some embodiments, the masking feature comprises a toggle switch of the software application for activating or deactivating data masking.

In some embodiments, automatically determining whether to mask the data comprises applying a prediction algorithm by comparing the physical location, the time, and the at least one network characteristic to the pattern. In some embodiments, automatically determining whether to mask the data comprises classifying the time as a work hour, a work day, a home hour or a transit hour based on the pattern. In some embodiments, automatically determining whether to mask the data comprises classifying the at least one network characteristic as home network, office network or public network based on the pattern. In some embodiments, automatically determining whether to mask the data comprises classifying the physical location as home, work or public based on the pattern.

In some embodiment, the prediction algorithm determines whether the mobile computing device is (i) at a safe location based on the physical location, (ii) connected to a trusted network based on the at least one network characteristic and (iii) accessing the data at an appropriate time based on the time of the day. If the mobile computing device is at a safe location, connected to a trusted network and accessing the data at an appropriate time, the prediction algorithm calculates a masking probability in relation to the usage pattern. The prediction algorithm further comprises automatically activating data masking if the masking probability is greater than a predetermined threshold. In some embodiments, the prediction algorithm further comprises automatically activating data masking if the mobile computing device is at least one of not in a safe location, not connected to a trusted network, or not accessing the data at an appropriate time. In some embodiments, the prediction algorithm further comprises automatically deactivating data masking if the masking probability is below or equal to the predetermined threshold.

BRIEF DESCRIPTION OF THE DRAWINGS

The advantages of the invention described above, together with further advantages, may be better understood by referring to the following description taken in conjunction with the accompanying drawings. The drawings are not necessarily to scale, emphasis instead generally being placed upon illustrating the principles of the invention.

DETAILED DESCRIPTION

Figure 1:
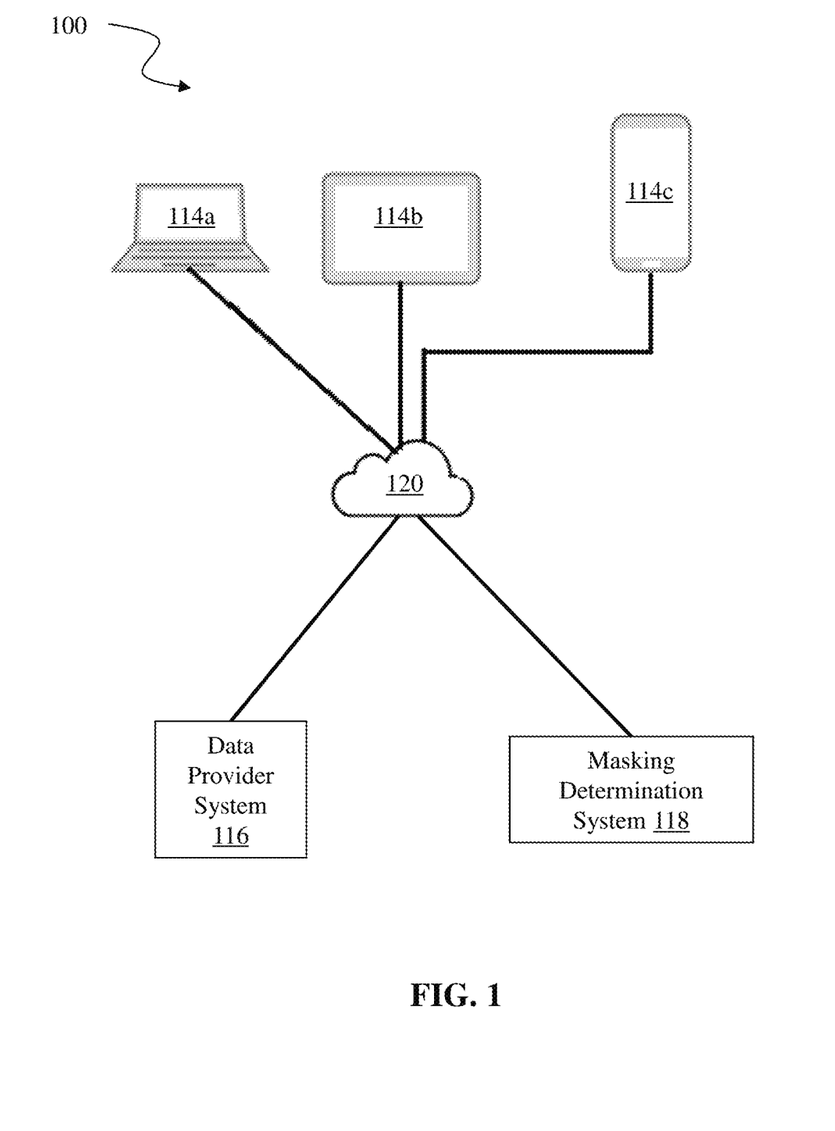
FIG. 1 is a block diagram of a network environment for enabling dynamic masking of data displayed on a mobile computing device, according to an illustrative embodiment of the invention.

FIG. 1 is a block diagram of a network environment 100 for enabling dynamic masking of data displayed on a mobile computing device, according to an illustrative embodiment of the invention. As shown, the network environment 100 includes one or more mobile user computing devices 114, a data provider system 116 and a masking determination system 118. A user, via one of the user computing devices 114, can make a request to the data provider system 116 to access and display data on the user computing device 114. In some embodiments, the user computing device 114 communicates the request to the data provider system 116 over an IP network 120. The data provider system 116 can forward the request, along with other pertinent information, to the masking determination system 118 to determine whether the requested data should be masked when it is displayed on the user computing device 114, along with which masking rules apply to the data display. The data provider system 116, upon receiving the masking decision and masking rules from the masking determination system 118, can provided the masked data for display on the user computing device 114. In some embodiments, the masking determination system 118 is integrated with the data provider system 116. In some embodiments, the masking determination system 118 is managed by a third party external to the data provider system 116.

Each of the user computing devices 114 can be a mobile computing device with a processor and memory that can execute instructions. In addition, each user computing device 114 can be a device with internet connectivity that may send or receive data from the internet. Further, each user computing device 114 can provide a graphical user interface (GUI) to facilitate viewing of data, either masked or unmasked, as described herein. Exemplary user computing devices 114 include but are not limited to laptop computers, tablets and smartphones. It should be appreciated that other types of mobile computing devices that are capable of connecting to the components of the system 100 can be used without departing from the scope of invention. In some embodiments, each of the user computing devices 114 has Global Position System (GPS) capabilities or other location-determining capabilities (e.g., connected to one or more geo-location sensors). For example, a user computing device 114 can transmit cellular signals that enable triangulation to its approximate physical location.

Each of the data provider system 116 and the determination system 118 is a combination of (i) hardware, including one or more processors and one or more physical memory modules, and (ii) specialized software engines that execute on a processor to receive data from other components of the system 100, transmit data to other components of the system 100, and perform functions for data masking as described herein. In some embodiments, the systems 116 and 118 are specialized sets of computer software instructions programmed onto a dedicated processor and can include specifically-designated memory locations and/or registers for executing the specialized computer software instructions. The systems 116 and 118 can be executed on the same processor or different processors.

Generally, the IP network 120 enables components of the system 100 to communicate with each other to perform the process of data masking as described herein. The IP network 120 may be a local network, such as a LAN, or a wide area network, such as the Internet and/or a cellular network. In some embodiments, the IP network 120 is comprised of several discrete networks and/or sub-networks (e.g., cellular to Internet) that enable the components of the system 100 to communicate with each other.

Figure 2:
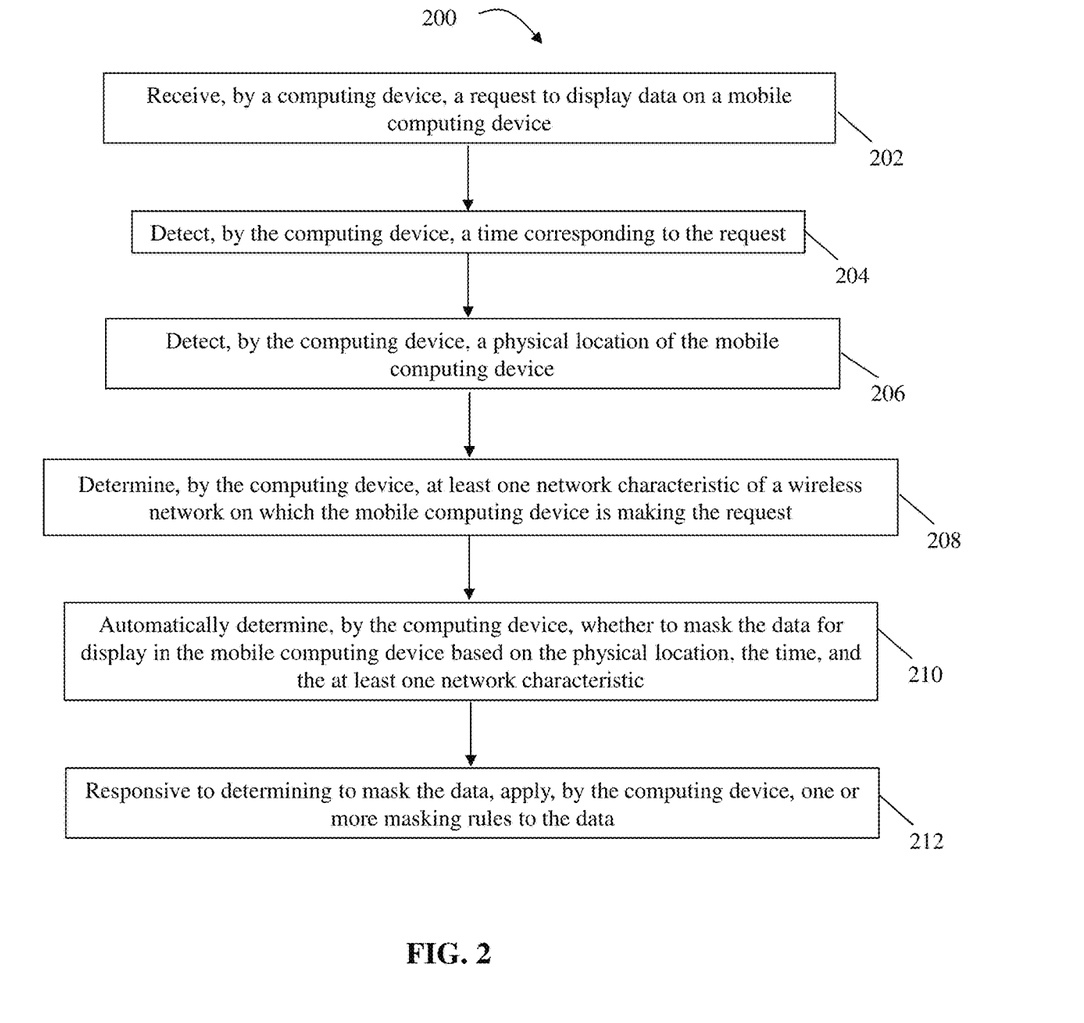
FIG. 2 is an illustrative process executed by the masking determination system of FIG. 1 to determine whether to mask data for display on a user computing device, according to an illustrative embodiment of the invention.

FIG. 2 is an illustrative process 200 executed by the masking determination system 118 of FIG. 1 to automatically determine whether to mask data for display on a user computing device 114, according to an illustrative embodiment of the invention. Generally, the automatic masking determination is based on comparing conditions associated with a current data display request with a usage profile/pattern and calculating a masking probability associated with the current conditions, where the masking probability is indicative of whether data masking is warranted.

The process 200 is initiated upon receiving a request from a user computing device 114 (e.g., via a software application installed on the user computing device) to display certain data on the device (step 202). The data display request can be forwarded to the masking determination system 118 from the data provider system 116 if the systems 116 are 118 are separate entities, or received directly by the masking determination system 118 from the user computing device 114 if the systems 116 and 118 are integrated. Along with the request, the user computing device 114 can transmit one or more conditions related to the request to enable the masking determination system 118 to automatically determine whether the requested data should be masked when displayed on the user computing device 114 and the applicable masking rules.

In some embodiments, the masking determination system 118 is configured to receive/detect from the user computing device 114 the time corresponding to the data display request (step 204). In some embodiments, the time of request is a fuzzy time period recorded as "early morning," "morning," "around noon," "early evening," "evening," "late night," etc. In some embodiments, the time of request represents the exact time of the day. The time of request can also indicate the day of the week or the day of the month when the request is made.

In some embodiments, the masking determination system 118 is also configured to receive/detect from the user computing device 114 an approximate physical location of the user where the data display request is made (step 206). For example, the masking determination system 118 can determine the user's physical location (e.g., map coordinates) based on signals emitted by the user computing device 114, such as cellular triangulation and GPS signals and/or publicly broadcasted Wi-Fi access points service set identifier (SSID) and media access control (MAC) data from neighboring Wi-Fi networks. The masking determination system 118 can also use a fuzzy logic approach to determine a fuzzy location, where the absolute physical coordinates of the user computing device 114 is not determined, but the spatial or planar relation between the user computing device 114 and another entity is. For example, the fuzzy location can be determined by a) the user computing device 114 being connected to a public network, such as a Wi-Fi network at a coffee shop, b) using the geolocation mechanism described above to pinpoint the device location to a coffee shop, and/or c) the distance the user computing device 114 is away from a reference location (e.g., home) of no more than a predetermined distance (e.g. 10 miles).

The masking determination system 118 is further configured to determine one or more characteristics associated with the wireless network to which the user computing device 114 is connected and through which the data display request is made (step 208). Characteristics of the wireless network can include whether the network is public or private network. Characteristics of the wireless network can also include traffic information of the network, such as a traffic pattern, of the network. Characteristics of the wireless network can further identify whether the network is a personal hotspot or a shared network (e.g., via Bluetooth).

In some embodiments, the user computing device 114 is configured to transmit to the data masking system 118 one or more of (i) the time associated the data display request, (ii) the physical location of the user computing device making the data display request, and/or (iii) the characteristics associated with the wireless network through which the request is made. For example, a software application installed on the user computing device 114 can be configured to automatically collect the data needed for the masking determination and transmit the data to the data provider system 116, which in turn forwards the data to the data masking system 118. In some embodiments, the data masking system 118 interacts with the user computing device 114 to retrieve the information required for the masking determination.

The masking determination system 118 is adapted to automatically determine whether to mask the data requested for display in the user computing device 114 based on the time, location and network characteristics information (step 210). This automatic determination can involve applying a prediction algorithm that (i) compares the received/detected data (from steps 204-208) associated with the current data display request with a usage profile of the user and (i) generates a masking probability based on the comparison. Generally, a usage profile corresponding to a user can be created and maintained in a rule engine 404 of the masking determination system 118, which is explained below in relation to FIG. 4. The usage profiles can be stored and indexed in the rule engine 404 in accordance with their corresponding user identifiers and/or other user identification information. Each usage profile contains data capturing historical conditions under which the user manually activated or deactivated data masking on his computing device 114, which can be utilized by the masking determination system 118 to calculate a probability level associated with the current request for data display.

Specifically, each usage profile comprises a pattern learned over time by the masking determination system 118 based on historical masking interactions of the user with the software application and/or the computing device 114. For example, the historical interactions can involve the user manually activating a masking feature of the application to mask data in the application. In some embodiments, the masking feature is a toggle button available in the setting section of the application. The toggle button, once activated, can turn on data masking across one or more pages of the application. Thus, the masking determination system 118 can intelligently discern a pattern from the conditions under which the user actively turned on or off the masking feature in the past to learn about the user's masking preference.

Each usage profile can store data related to the user manually activating or deactivating the masking feature at a past point in time. In some embodiments, this data includes a time when the user initiated the masking feature. Time plays an important role as it can indicated whether the user initiated the data masking at a time that he is likely in a public space, such as during commute time or work time. Thus, the usage profile can discern a time-based pattern of when a user activated data masking. In one example, a time-based pattern includes the date and time, day of the week, and corresponding mask condition (i.e., indication of whether data was masked or unmasked). In some embodiments, each usage profile includes data related to the location of the user computing device 114 when the user activated data masking. The location can be generalized categorized as home, work, public or other types of locations. Thus, the usage profile can discern a location-based pattern of when a user activated data masking. In one example, a location-based pattern includes location coordinates (e.g., latitude and longitude), location category if available (e.g., home, work, or public) and the corresponding mask condition (i.e., an indication of whether data was masked or unmasked). In some embodiments, each usage profile includes data related to the identity of the wireless network (e.g., a Wi-Fi domain) to which the user computing device was connected when the user activated data masking. The wireless network can be generally categorized as either public or private. Thus, the usage profile can discern a domain-based pattern of when a user activated data masking. In one example, a domain-based pattern includes the network type (e.g., public, private or shared), network security type (e.g., a security level), network name if available, and corresponding mask condition (i.e., an indication of whether data was masked or unmasked).

Figure 3:
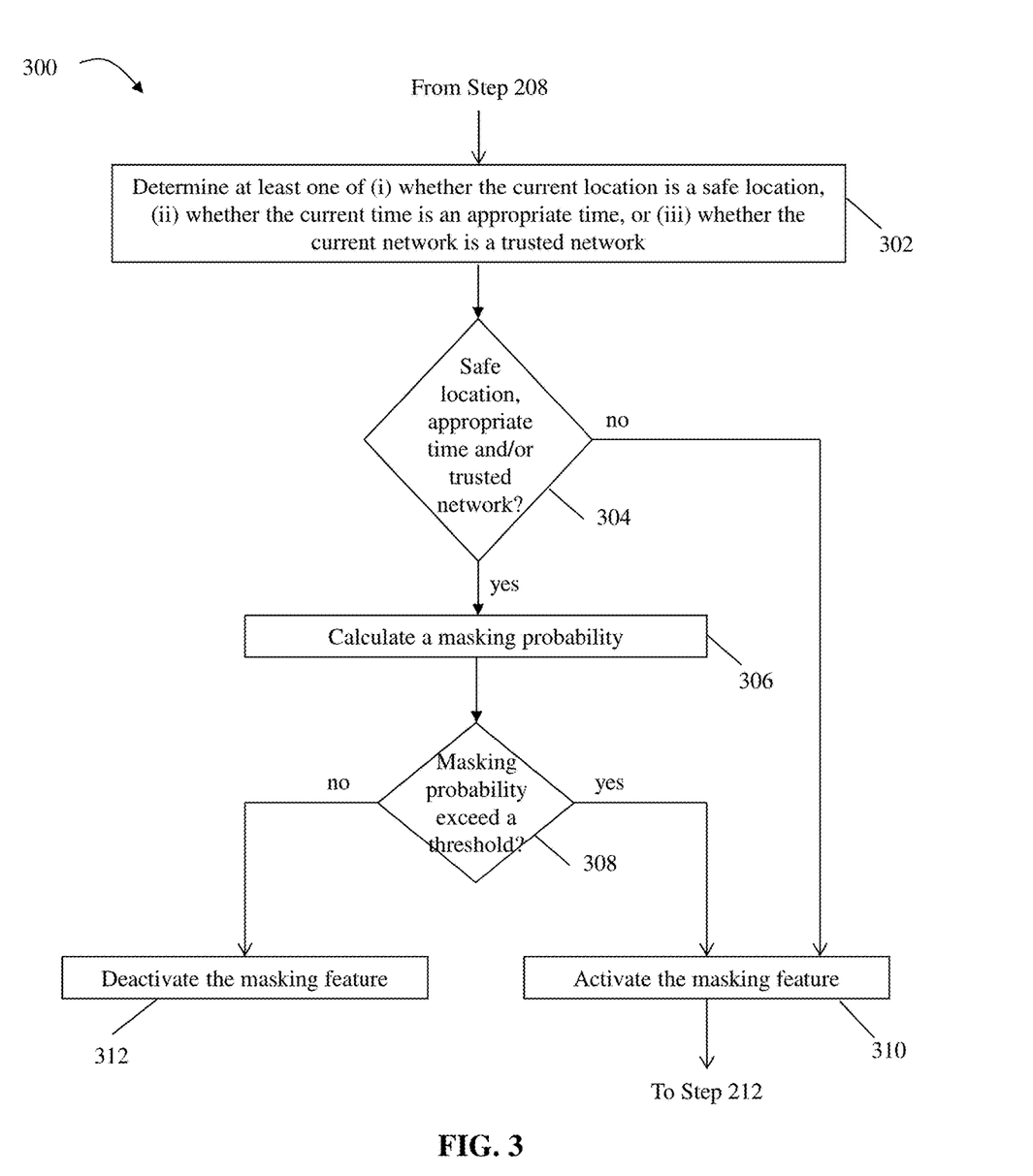
FIG. 3 is an illustrative prediction process executed by the masking determination system of FIG. 1 to automatically determine data masking, according to an illustrative embodiment of the invention.

The masking determination system 118 is adapted to apply a prediction algorithm to automatically determine whether to mask the data requested for display in the user computing device 114 (step 210) by comparing the time, location and network characteristics information associated with the current data display request with the usage profile of the individual making the request. FIG. 3 is an illustrative prediction process 300 executed by the masking determination system 118 to automatically determine data masking, according to an illustrative embodiment of the invention. This prediction process 300 can be executed at step 210 of the process 200 of FIG. 2.

For the prediction process 300, the masking determination system 118 initially determines at least one of (i) whether the current location associated with the data display request is a safe location, (ii) whether the current time associated with the data display request is an appropriate time, or (iii) whether the current network associated with the data display request is a trusted network (step 302). Determining whether the current location is a safe location can be accomplished by classifying the current location as a particular location type (e.g., home, work or public) based on the user's usage profile and determining if the location type of the current request is a safe location. For example, if the location type is home or work, this suggests that the location of the current request is a safe location. However, if the location type is public, this suggests that the location is an unsafe location. Determining whether the current time is an appropriate time can be accomplished by classifying the current time as a particular time type (e.g., work hour, home hour or transit hour) based on the user's usage profile and determining if the time type of the current request is appropriate. For example, while home and work hours are appropriate times, transit hour is not. Determining whether the current network is a trusted network can be accomplished by classifying the current network as a particular network type (e.g., home network, office network or public network) based on the user's usage profile and determining if the network type of the current request is trusted. For example, while home network and office network can be trusted, public network is not.

If the masking determination system 118 determines that the current request is from at least one of a safe location, made at an appropriate time, or on a trusted network (step 304), the masking determination system 118 proceeds to calculate a masking probability (step 306). For example, in some embodiments, all three conditions must be satisfied prior to calculating a masking probability. If at least one of the conditions is not satisfied (i.e., the current request is from an unsafe location, made at an inappropriate time, and/or from an untrustworthy network), the masking determination system 118 proceeds to automatically activate the data masking feature in response to the data display request (step 310).

The masking probability can be a conditional probability where the location, time and wireless network characteristic of the current data display request are in independent variables that are compared to the masking pattern, which is a dependent variable. Equation 1 below shows an exemplary equation according to which a masking probability P(M) can be calculated.

$$P(M) = \frac{P(M) * P\left(\frac{L}{M}\right)}{P(L)} * \frac{P(M) * P\left(\frac{D}{M}\right)}{P(D)} * \frac{P(M) * P\left(\frac{W}{M}\right)}{P(W)} \quad \text{(Equation 1)}$$

In Equation 1, L represents a location-based pattern and P(L) represents the probability that the location of the current data display request is a safe location using the location-based pattern L. For example, as explained above, location can be generally defined as home, work, public, or of another type. While home and work are safe locations, others are not. In Equation 1, D represents a time-based pattern and P(D) represents the probability that the time of the current data display request is appropriate using the time-based pattern D. For example, as explained above, time can be generally defined as work hour, home hour and transit hour. While home and work hours are appropriate times, transit hour is not. Such categorization of time can be achieved based on learning from the usage profile/pattern of the user. In Equation 1, W represents a domain-based pattern and P(W) represents the probability that the network of the current data request is a trusted network using the domain-based pattern W. For example, as explained above, a network can be generally defined as home network, office network and public network. While home network and office network can be trusted, public network is not. Again, such categorization of the network can be achieved based on learning from the usage profile/pattern of the user.

The masking determination system 118 proceeds to compare the masking probability with a predetermine threshold (e.g., 0.65) to determine whether the masking probability exceeds the threshold (step 308). If the masking probability exceeds (e.g., above) the threshold, the masking determination system 118 is adapted to cause automatic activation of the masking feature such that the requested data displayed on the user computing device 114 is masked (step 310). Otherwise, if the masking probability does not exceed (e.g., below or the same as) the predetermined threshold, the determination system 118 is adapted to cause automatic deactivation of the masking feature such that the requested data is displayed normally on the user computing device 114 without masking (step 312). Thus, the prediction algorithm can cause data masking to be activated based on a user's usage profile/pattern even if the data display request is initially determined to be from a safe location, at an appropriate time and/or on a trusted network. For example, if the user is in the cafeteria of his workplace, the user may tend to manually switch on the masking feature and this pattern is captured by his usage profile. Therefore, whenever the user is in the workplace cafeteria the masking feature is tuned on automatically as determined by the prediction process 300, even though the workpiece is deemed to be a safe location.

In some embodiments, upon initiation of the software application from which the data display request is made, the data masking feature (e.g., a toggle switch for masking data) is automatically turned on or off based on the outcome of the prediction algorithm 300. However, if the user manually chooses the opposite of the automatic setting, information associated with the manual correction (e.g., time, location and network identity) is recorded by the user computing device 114 and sent to the masking determination system 118 to update the user's usage profile such that the usage profile evolves over time by continuously learning about the user's preference.

With reference to FIG. 2, after the masking determination system 118 determines to automatically activate data masking in response to a data display request, the system 118 can also determine one or more masking rules to apply to the requested data (step 212). For example, the masking rules can comprise masking every character in a data string displayed. The masking determination system 118 can interact with the data provider system 116 to mask the data from the data provider system 116 prior to displaying the data on the user computing device 114.

Figure 4:
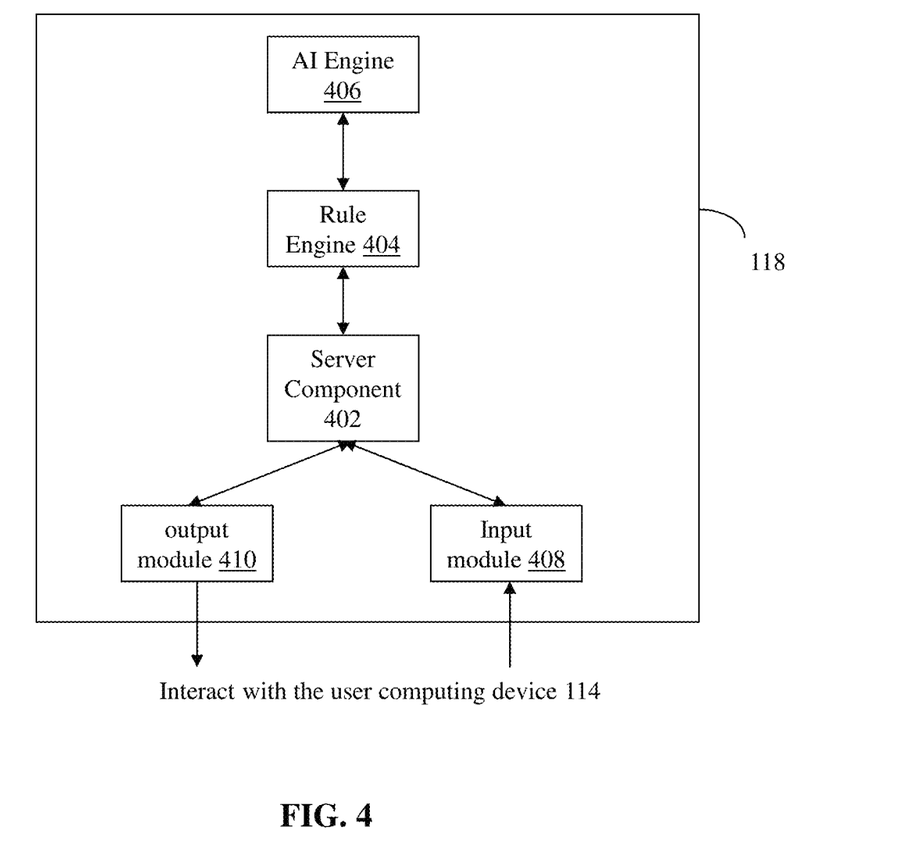
FIG. 4 is a block diagram of the masking determination system of FIG. 1, according to an illustrative embodiment of the invention.

FIG. 4 is a block diagram of the masking determination system 118 of FIG. 1, according to an illustrative embodiment of the invention. As shown, the masking determination system 118 includes a server 402, a rule engine 404 and an artificial intelligence (AI) engine 406. The server 402 is adapted to interact with an input module 408 to receive information related to a request to display data from a user computing device 114. This request may be forwarded to the masking determination system 118 via the data provider system 116. The information received by the input module 408 includes, for example, the location of the request, the time of the request and the characteristic of the network from which the request is made. In some embodiments, location information is obtained by the masking determination system 118 interacts with one or more geo-sensors, GPS, WIFI and/or cellular network of the user computing device 114. Generally, the masking determination system 118 is adapted to interact with existing hardware capabilities of the user computing device 114 to collect the data needed for making a masking determination. Upon receiving the information associated with the data display request, the server 402 is configured to execute the process 200, including the subroutine 300, to determine whether to automatically mask the requested data when it is displayed on the user computing device 114.

To make such a determination, the server 402 interacts with the rule engine 404 that is configured to update and maintain one or more usage profiles, including the usage profile of the user corresponding to the requesting computing device 114. As described above, each usage profile includes one or more rules and patterns describing the preferences of the user with respect to data masking. The rule engine 404 further interacts with the AI engine 406 to ensure that each usage profile continuously learns about the behavior/preference of the user based on the user's interaction over time with a masking feature of the user computing device 114. For example, the AI engine 406 is can learn the masking preference of a user based on the location, time, and network data associated with each time the user manually activates or deactivates the masking feature. The AI engine 406 can update the usage profile of the rule engine 404 accordingly based on the learning.

In some embodiments, the server 402 is configured to interact with an output module 410 to convey to and enforce its masking determination on the user computing device 114. For example, if the server 402 decides that data masking is needed, the server 402 interacts with the data provider system 116 in order to apply certain masking rules to the data from the data provider system 116 prior to the system 116 displaying the data on the user computing device 114. Masking rules include, for example, obscuring every character or every other character in a data string displayed.

The above-described techniques can be implemented in digital and/or analog electronic circuitry, or in computer hardware, firmware, software, or in combinations of them. The implementation can be as a computer program product, i.e., a computer program tangibly embodied in a machine-readable storage device, for execution by, or to control the operation of, a data processing apparatus, e.g., a programmable processor, a computer, and/or multiple computers. A computer program can be written in any form of computer or programming language, including source code, compiled code, interpreted code and/or machine code, and the computer program can be deployed in any form, including as a stand-alone program or as a subroutine, element, or other unit suitable for use in a computing environment. A computer program can be deployed to be executed on one computer or on multiple computers at one or more sites. The computer program can be deployed in a cloud computing environment (e.g., Amazon® AWS, Microsoft® Azure, IBM®).

Method steps can be performed by one or more processors executing a computer program to perform functions of the invention by operating on input data and/or generating output data. Method steps can also be performed by, and an apparatus can be implemented as, special purpose logic circuitry, e.g., a FPGA (field programmable gate array), a FPAA (field-programmable analog array), a CPLD (complex programmable logic device), a PSoC (Programmable System-on-Chip), ASIP (application-specific instruction-set processor), or an ASIC (application-specific integrated circuit), or the like. Subroutines can refer to portions of the stored computer program and/or the processor, and/or the special circuitry that implement one or more functions.

Processors suitable for the execution of a computer program include, by way of example, special purpose microprocessors specifically programmed with instructions executable to perform the methods described herein, and any one or more processors of any kind of digital or analog computer. Generally, a processor receives instructions and data from a read-only memory or a random access memory or both. The essential elements of a computer are a processor for executing instructions and one or more memory devices for storing instructions and/or data. Memory devices, such as a cache, can be used to temporarily store data. Memory devices can also be used for long-term data storage. Generally, a computer also includes, or is operatively coupled to receive data from or transfer data to, or both, one or more mass storage devices for storing data, e.g., magnetic, magneto-optical disks, or optical disks. A computer can also be operatively coupled to a communications network in order to receive instructions and/or data from the network and/or to transfer instructions and/or data to the network. Computer-readable storage mediums suitable for embodying computer program instructions and data include all forms of volatile and non-volatile memory, including by way of example semiconductor memory devices, e.g., DRAM, SRAM, EPROM, EEPROM, and flash memory devices; magnetic disks, e.g., internal hard disks or removable disks; magneto-optical disks; and optical disks, e.g., CD, DVD, HD-DVD, and Blu-ray disks. The processor and the memory can be supplemented by and/or incorporated in special purpose logic circuitry.

To provide for interaction with a user, the above described techniques can be implemented on a computing device in communication with a display device, e.g., a CRT (cathode ray tube), plasma, or LCD (liquid crystal display) monitor, a mobile computing device display or screen, a holographic device and/or projector, for displaying information to the user and a keyboard and a pointing device, e.g., a mouse, a trackball, a touchpad, or a motion sensor, by which the user can provide input to the computer (e.g., interact with a user interface element). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, and/or tactile input.

The above-described techniques can be implemented in a distributed computing system that includes a back-end component. The back-end component can, for example, be a data server, a middleware component, and/or an application server. The above described techniques can be implemented in a distributed computing system that includes a front-end component. The front-end component can, for example, be a client computer having a graphical user interface, a Web browser through which a user can interact with an example implementation, and/or other graphical user interfaces for a transmitting device. The above described techniques can be implemented in a distributed computing system that includes any combination of such back-end, middleware, or front-end components.

The components of the computing system can be interconnected by transmission medium, which can include any form or medium of digital or analog data communication (e.g., a communication network). Transmission medium can include one or more packet-based networks and/or one or more circuit-based networks in any configuration. Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), Bluetooth, near field communications (NFC) network, Wi-Fi, WiMAX, general packet radio service (GPRS) network, HiperLAN), and/or other packet-based networks. Circuit-based networks can include, for example, the public switched telephone network (PSTN), a legacy private branch exchange (PBX), a wireless network (e.g., RAN, code-division multiple access (CDMA) network, time division multiple access (TDMA) network, global system for mobile communications (GSM) network), and/or other circuit-based networks.

Information transfer over transmission medium can be based on one or more communication protocols. Communication protocols can include, for example, Ethernet protocol, Internet Protocol (IP), Voice over IP (VOIP), a Peer-to-Peer (P2P) protocol, Hypertext Transfer Protocol (HTTP), Session Initiation Protocol (SIP), H.323, Media Gateway Control Protocol (MGCP), Signaling System #7 (SS7), a Global System for Mobile Communications (GSM) protocol, a Push-to-Talk (PTT) protocol, a PTT over Cellular (POC) protocol, Universal Mobile Telecommunications System (UMTS), 3GPP Long Term Evolution (LTE) and/or other communication protocols.

Devices of the computing system can include, for example, a computer, a computer with a browser device, a telephone, an IP phone, a mobile computing device (e.g., cellular phone, personal digital assistant (PDA) device, smart phone, tablet, laptop computer, electronic mail device), and/or other communication devices. The browser device includes, for example, a computer (e.g., desktop computer and/or laptop computer) with a World Wide Web browser (e.g., Chrome™ from Google, Inc., Microsoft® Internet Explorer® available from Microsoft Corporation, and/or Mozilla® Firefox available from Mozilla Corporation). Mobile computing device include, for example, a Blackberry® from Research in Motion, an iPhone® from Apple Corporation, and/or an Android™-based device. IP phones include, for example, a Cisco® Unified IP Phone 7985G and/or a Cisco® Unified Wireless Phone 7920 available from Cisco Systems, Inc.

Comprise, include, and/or plural forms of each are open ended and include the listed parts and can include additional parts that are not listed. And/or is open ended and includes one or more of the listed parts and combinations of the listed parts.

One skilled in the art will realize the subject matter may be embodied in other specific forms without departing from the spirit or essential characteristics thereof. The foregoing embodiments are therefore to be considered in all respects illustrative rather than limiting of the subject matter described herein.

What is claimed is:

1. A computer-implemented method for automatically masking data for display in a mobile computing device of a user, the computer-implemented method comprising:
   receiving, by a computing device, a request from the user to display data from a software application on the mobile computing device;
   detecting, by the computing device, a physical location of the mobile computing device;
   detecting, by the computing device, a time corresponding to the request;
   determining, by the computing device, at least one network characteristic of a wireless network on which the mobile computing device is making the request;
   determining, by the computer device, satisfaction of a plurality of criteria including whether the physical location is a classified safe location, whether the time of request is an appropriate time, and whether the network characteristic establishes a trusted network;
   when one or more of the plurality of criteria is satisfied, automatically determining, by the computing device, whether to mask the data for display on the mobile computing device by;
   calculating a masking probability based on evaluating the physical location, the time, and the at least one network characteristic of the wireless network of the request against a pattern learned from historical interactions of the user with the software application, the historical interactions comprising the user manually activating a masking feature to mask data in the software application; and
   generating a signal to mask the data when the masking probability exceeds a predetermined threshold; and
   responsive to the signal to mask the data, automatically applying, by the computing device, one or more masking rules to the data.

2. The computer-implemented method of claim 1, wherein the pattern is generated based on a plurality factors including locations of the mobile computing device when the masking feature was activated, times of the day when the masking feature was activated, and characteristics of wireless networks associated with the mobile computing device when the masking feature was activated.

3. The computer-implemented method of claim 1, wherein the masking feature comprises a toggle switch of the software application for activating or deactivating data masking.

4. The computer-implemented method of claim 1, wherein automatically determining whether to mask the data comprises classifying the time as a work hour, a work day, a home hour or a transit hour based on the pattern.

5. The computer-implemented method of claim 1, wherein automatically determining whether to mask the data comprises classifying the at least one network characteristic as home network, office network or public network based on the pattern.

6. The computer-implemented method of claim 1, wherein automatically determining whether to mask the data comprises classifying the physical location as home, work or public based on the pattern.

7. The computer-implemented method of claim 1, wherein calculating the masking probability and generating the signal to mask the data are performed when all the plurality of criteria are satisfied.

8. The computer-implemented method of claim 7, further comprises generating the signal to mask the data without computing the masking probability when at least one of the plurality of criteria is not satisfied.

9. The computer-implemented method of claim 1, further comprising automatically deactivating data masking if the masking probability is below or equal to the predetermined threshold.

10. The computer-implemented method of claim 1, wherein the one or more masking rules comprise masking every character of a data string.

11. The computer-implemented method of claim 1, wherein the time corresponding to the request comprises one of a time of the day, a day of the week or a day of the month of the request.

12. A computer program product, tangibly embodied in a non-transitory computer readable storage device, for automatically masking data for display in a mobile computing device of a user, the computer program product including instructions operable to cause a computing device to:
   receive a request from the user to display data from a software application on the mobile computing device;
   detect a physical location of the mobile computing device, a time corresponding to the request, and at least one network characteristic of a wireless network on which the mobile computing device is making the request;
   determine satisfaction of a plurality of criteria including whether the physical location is a classified safe location, whether the time of request is an appropriate time, and whether the network characteristic establishes a trusted network;
   when at least one of the plurality of criteria is satisfied, automatically determine whether to mask the data for display in the mobile computing device, including:
   calculate a masking probability based on evaluating the physical location, the time, and the at least one network characteristic of the wireless network of the request against a usage pattern learned from historical interactions of the user with the software application, the historical interactions comprising the user manually activating a masking feature to mask data in the software application; and
   generate a signal to mask the data if the masking probability exceeds a predetermined threshold; and
   responsive to the signal to mask the data, automatically apply one or more masking rules to the data.

13. The computer program product of claim 12, wherein the instructions operable to cause the computing device to calculate the masking probability in relation to the usage pattern and generate the signal to mask the data based on the masking probability are executed when all of the plurality of criteria are satisfied.

14. The computer program product of claim 13, further comprises instructions operable to cause the computing device to generate the signal to mask the data without computing the masking probability when at least one of the plurality of criteria is not satisfied.

15. A computer system, in electrical communication with a mobile computing device, configured to automatically mask data for display in the mobile computing device, the computer system comprising:
   a processor;
   a memory;
   an input module for receiving a request from the mobile computing device to display data from a software application on the mobile computing device, the request includes a physical location of the mobile computing device, a time corresponding to the request, and at least one network characteristic of a wireless network on which the mobile computing device is making the request;
   a server component configured to:
   determine satisfaction of a plurality of criteria including whether the physical location is a classified safe location, whether the time of request is an appropriate time, and whether the network characteristic establishes a trusted network;
   when all of the plurality of criteria are satisfied automatically determine whether to mask the data for display on the mobile computing device by;
   calculating a masking probability based on evaluating the physical location, the time, and the at least one network characteristic of the wireless network of the request with against a usage profile of a user corresponding to the mobile computing device learned from historical interactions of the user with the software application, the historical interactions comprising the user manually activating a masking feature to mask data in the software application; and
   generating a signal to mask the data if the masking probability exceeds a predetermined threshold; and
   when at least one the plurality of criteria is not satisfied, generate the signal to mask the data without computing the masking probability;
   a rule engine for maintaining and updating the usage profile to capture a pattern in data masking preference of the user; and
   an output module for applying one or more masking rules to the data in response to the signal to mask the data.

* * * * *